(12) United States Patent
Nakazono et al.

(10) Patent No.: US 9,507,094 B2
(45) Date of Patent: Nov. 29, 2016

(54) OPTICAL CONNECTOR

(71) Applicant: Yazaki Corporation, Minato-ku, Tokyo (JP)

(72) Inventors: Akimichi Nakazono, Yokosuka (JP); Tomohiro Wakabayashi, Yokosuka (JP); Hisao Matsukura, Yokosuka (JP)

(73) Assignee: Yazaki Corporation, Minato-ku, Tokyo (JP)

(*) Notice: Subject to any disclaimer, the term of this patent is extended or adjusted under 35 U.S.C. 154(b) by 0 days.

(21) Appl. No.: 14/963,573

(22) Filed: Dec. 9, 2015

(65) Prior Publication Data

US 2016/0091668 A1 Mar. 31, 2016

Related U.S. Application Data

(63) Continuation of application No. PCT/JP2014/067237, filed on Jun. 27, 2014.

(30) Foreign Application Priority Data

Jul. 4, 2013 (JP) .................................. 2013-140321

(51) Int. Cl.
*G02B 6/38* (2006.01)

(52) U.S. Cl.
CPC ........... *G02B 6/3809* (2013.01); *G02B 6/3857* (2013.01)

(58) Field of Classification Search
CPC .......................... G02B 6/3857; G02B 6/3809
See application file for complete search history.

(56) References Cited

U.S. PATENT DOCUMENTS

| | | | |
|---|---|---|---|
| 3,982,815 | A | 9/1976 | Nakayama |
| 4,236,787 | A | 12/1980 | Iacono et al. |
| 5,239,602 | A | 8/1993 | Hunsberger et al. |
| 5,283,850 | A | 2/1994 | Souloumiac |
| 5,694,506 | A | 12/1997 | Kobayashi et al. |
| 7,717,623 | B2 | 5/2010 | Ohtsuka et al. |
| 2006/0257079 | A1 | 11/2006 | Ohtsuka et al. |
| 2008/0013891 | A1 | 1/2008 | Nishioka et al. |

FOREIGN PATENT DOCUMENTS

| | | |
|---|---|---|
| EP | 23436 A1 | 2/1981 |
| GB | 1447469 A | 8/1976 |
| GB | 2004664 A | 4/1979 |
| JP | S50-133847 A | 10/1975 |
| JP | S50-156449 A | 12/1975 |
| JP | S54-054053 A | 4/1979 |
| JP | S56-021111 A | 2/1981 |

(Continued)

OTHER PUBLICATIONS

Sep. 22, 2014—International Search Report—Intl App PCT/JP2014/067237.

(Continued)

*Primary Examiner* — Omar R Rojas
(74) *Attorney, Agent, or Firm* — Banner & Witcoff, Ltd.

(57) ABSTRACT

An optical connector is provided with a first housing, a first optical fiber accommodated in the first housing, a second housing to which the first housing fits, and a second optical fiber accommodated in the second housing. An end face of the first optical fiber abuts on an end face of the second optical fiber due to fitting the first housing to the second housing so that the first optical fiber and the second optical fiber are optically connected.

8 Claims, 5 Drawing Sheets

(56) References Cited

FOREIGN PATENT DOCUMENTS

| JP | S60-051518 B2 | 11/1985 |
| JP | H09-159860 A | 6/1997 |
| JP | 2006-317890 A | 11/2006 |

OTHER PUBLICATIONS

Sep. 22, 2014—(WO) Written Opinion of the ISA—Intl App PCT/JP2014/067237.

OPTICAL CONNECTOR

CROSS REFERENCE TO RELATED APPLICATIONS

This application claims priority from Japanese Patent Application No. 2013-140321 filed on Jul. 4, 2013, the entire contents of which are incorporated herein by reference.

TECHNICAL FIELD

The present invention relates to an optical connector that optically connects optical fibers, end faces of which abut, without using a ferrule.

BACKGROUND ART

In the related art, there is an optical connector that optically connects optical fibers, end faces of which abut. Some of the optical connectors use a ferrule that holds an optical fiber. Since a highly accurate dimension is required for the ferrule, a problem arises in that high costs are incurred or a problem arises in that an extended amount of time is required for an operation of bonding and fixing the optical fiber in a hole of the ferrule and for an operation of polishing an end face of the optical fiber.

In order to solve problems in a case where the ferrule is used, PTL1 proposes an optical connector in which the ferrule is not used.

The optical connector disclosed in PTL 1 optically connects the optical fibers by mating the optical connectors and abutting of the end faces of the optical fibers.

PRIOR ART LITERATURE

Patent Literature

[Patent Literature 1] JP-A-2006-317890

SUMMARY OF INVENTION

Technical Problem

However, in the optical connector disclosed in Patent Literature 1, since the optical fiber insertion hole has a clearance for enabling each optical fiber to be inserted into the optical fiber insertion hole, there is a concern that axes of the end faces of the optical fibers, which abut, will be shifted, and thus optical connection loss will be increased.

Taking into account the above problem, an object of the present invention is to provide an optical connector in which it is possible to suppress optical connection loss.

Solution to Problem

In order to solve the above problem and achieve the object, an optical connector according to the present invention comprising a first housing, a first optical fiber accommodated in the first housing, a second housing to which the first housing fits, and a second optical fiber accommodated in the second housing,
wherein an end face of the first optical fiber abut on an end face of the second optical fiber due to the fitting of the first housing in the second housing so that the first optical fiber and the second optical fiber are optically connected,
the first housing comprising a cylindrical hole in which a front end portion of the first optical fiber is accommodated and a front end portion of the second optical fiber is insertable and which is elastically deformable to have a decreased diameter, and a cylindrical protrusion section which protrudes to have a cylindrical shape in a direction toward a front end of the first housing,
the second housing comprising a pressing section which presses the outer circumferential surface of the cylindrical protrusion section so that the cylindrical hole is deformed to have a decreased diameter,
wherein the cylindrical hole is deformed to have a decreased diameter by the pressing section, and thereby the front end portions of the first optical fiber and the second optical fiber are held in the cylindrical hole in a state that the end face of the front end portion of the first optical fiber abuts on the end face of the front end portion of the second optical fiber, in a case where the first housing is fitted to the second housing.

In addition, in the optical connector of the present invention according to the above invention, at least one of the first housing and the second housing further comprising a space in which an excess amount of the first optical fiber and the second optical fiber is configured to be bent and received.

In addition, in the optical connector of the present invention according to the above invention, slits are formed from the end face at positions of point symmetry around the cylindrical hole in the cylindrical protrusion section.

In addition, in the optical connector of the present invention according to the above invention, a contact surface of the cylindrical protrusion section with the pressing section may be parallel to an optical axis direction, in a case where the first housing is fitted to the second housing.

In the optical connector of the present invention, wherein the cylindrical hole is deformed to have a decreased diameter by the pressing section, and thereby the front end portions of the first optical fiber and the second optical fiber are held in the cylindrical hole in a state that the end faces of the front end portions abut in a case where the first housing fits to the second housing together. Accordingly, since the axes of the abutting first and second optical fibers are not shifted, it is possible to suppress optical connection loss.

In addition, in the optical connector of the present invention, the first optical fiber and the second optical fiber are configured to be bent into the space, and thereby it is possible for the excess length of the first optical fiber and the second optical fiber to be received in the space.

In addition, in the optical connector of the present invention, the plurality of slits formed in the front end portion of the cylindrical protrusion section enables the cylindrical hole to be elastically deformed and to have a decreased diameter and it is possible to hold the first optical fiber and the second optical fiber while the cylindrical protrusion section applies a uniform pressing force to the outer circumferential surfaces of the first optical fiber and the second optical fiber.

In addition, in the optical connector of the present invention, even when a fitting position is shifted in the optical axis direction due to backlash, the contact surface of the cylindrical protrusion section with the pressing section is parallel to the optical axis direction. Accordingly, a zone of the contact surface is adjusted to be longer than a length of the shift of the fitting position due to the backlash, and thereby the cylindrical hole can maintain the hole diameter, in which the fibers are held in the state in which the first optical fiber and the second optical fiber abut. As a result, it is possible to reliably hold the first optical fiber and the second optical fiber even when there is backlash in the optical connector.

Advantageous Effects of Invention

According to the present invention, since axes of two abutting optical fibers are not shifted, it is possible to suppress optical connection loss.

DESCRIPTION OF EMBODIMENTS

Hereinafter, an exemplary embodiment of an optical connector according to the present invention will be described in detail with reference to the drawings.

EXAMPLE

Figure 1:
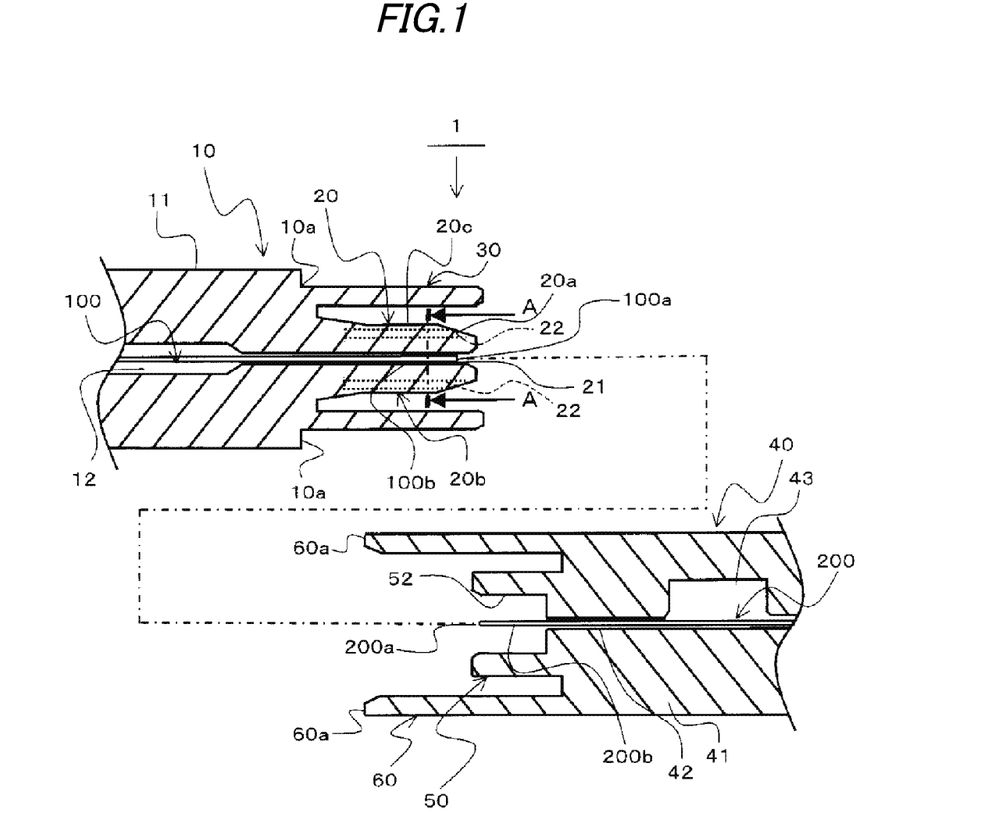
FIG. 1 is a sectional view illustrating a configuration of an optical connector according to an example of the present invention.
Figure 2A:
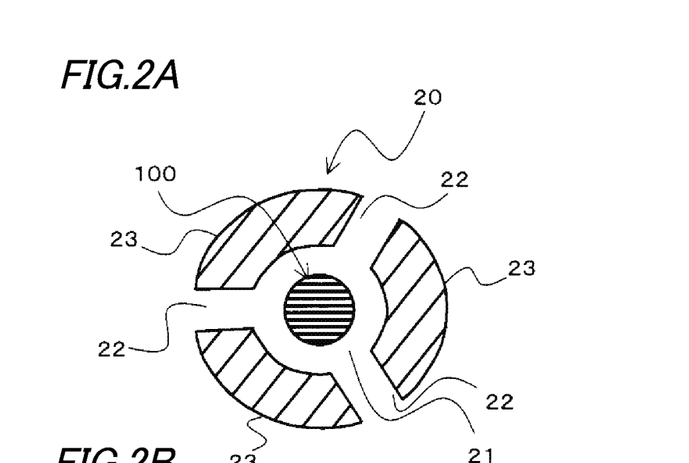
FIG. 2A is a sectional view illustrating a cylindrical protrusion section when viewed on a sectional plane taken along line A-A in FIG. 1
Figure 2B:
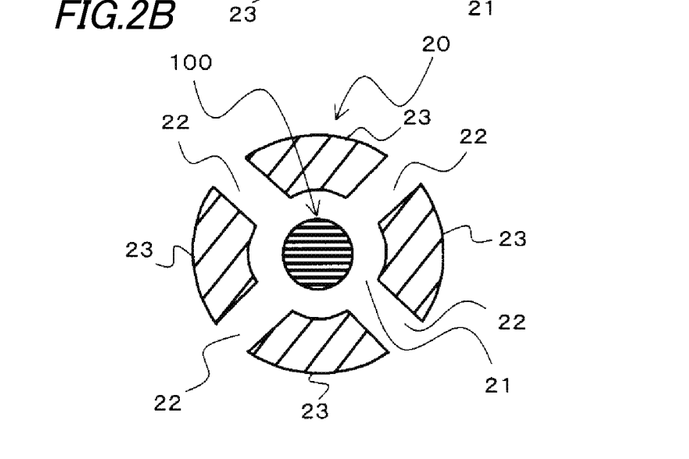
FIG. 2B is a sectional view illustrating a modification example of the cylindrical protrusion section illustrated in FIG. 2A.
Figure 3:
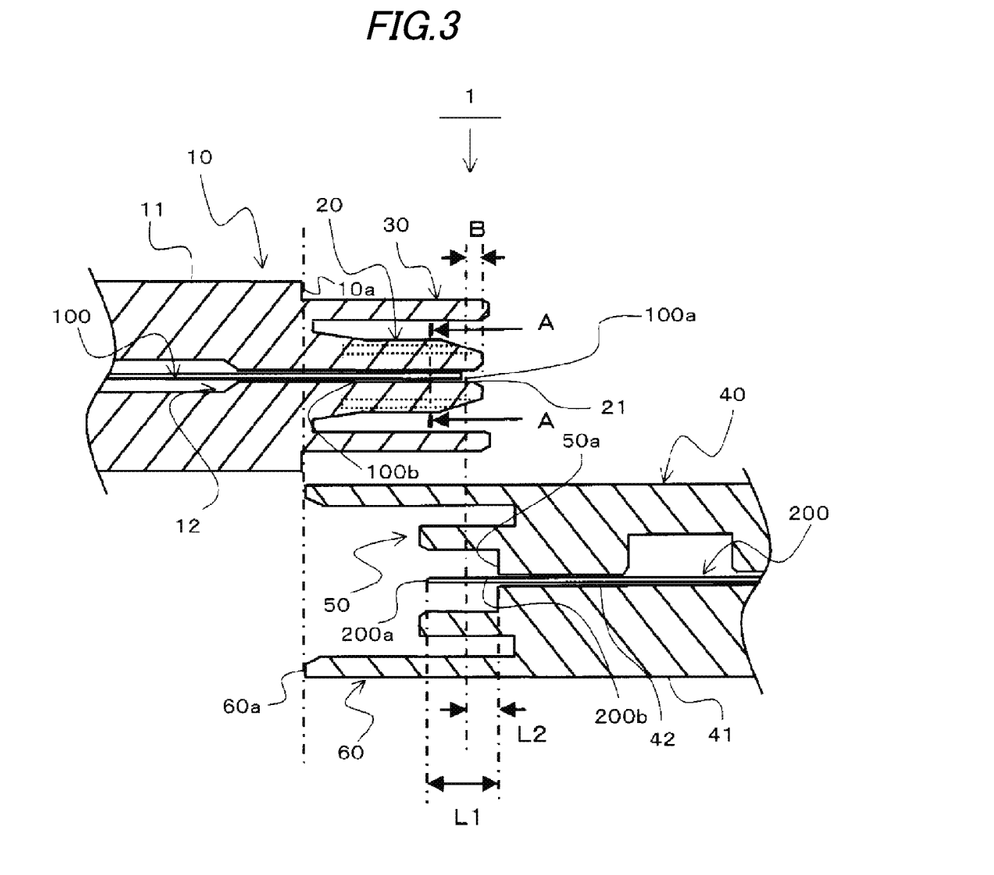
FIG. 3 is a view showing dimensions of respective positions of the optical connector.
Figure 4:
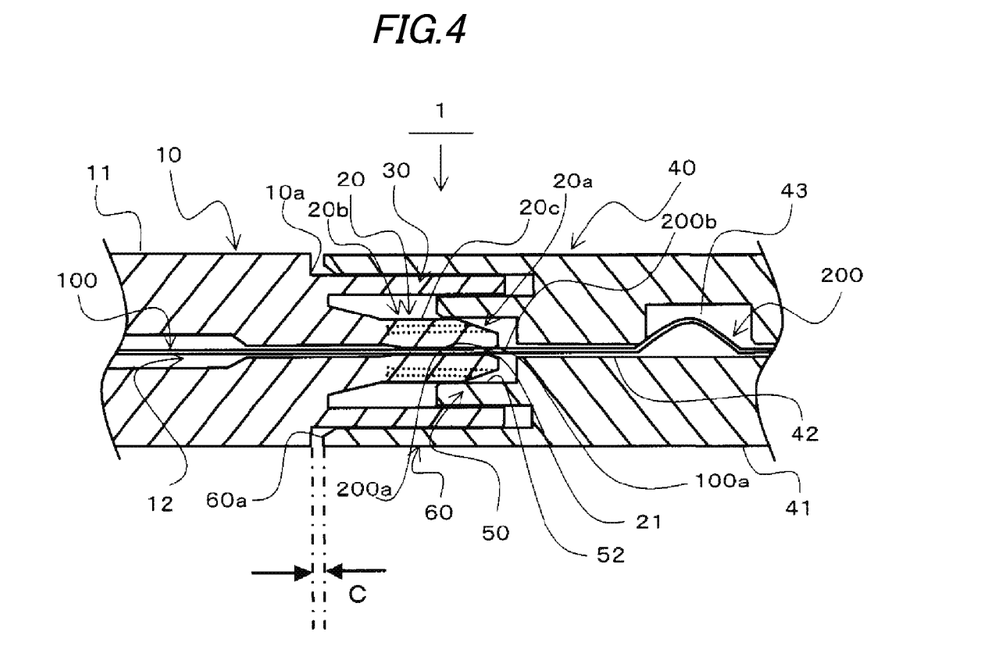
FIG. 4 is a sectional view illustrating a state in which a fitting position is shifted in an optical axis direction due to backlash of the optical connector.

FIG. 1 is a sectional view illustrating a configuration of an optical connector 1 according to an example of the present invention. FIG. 2A is a sectional view illustrating a cylindrical protrusion section 20 when viewed on a sectional plane taken along line A-A in FIG. 1 and FIG. 2B is a sectional view illustrating a modification example of the cylindrical protrusion section illustrated in FIG. 2A. FIG. 3 is a view showing dimensions of respective positions of the optical connector 1. FIG. 4 is a sectional view illustrating a state in which a fitting position is shifted in an optical axis direction due to backlash of the optical connector 1.

The optical connector 1 according to the example of the present invention includes a first housing 10, a first optical fiber 100 accommodated in the first housing 10, a second housing 40 in which the first housing 10 fits, and a second optical fiber 200 accommodated in the second housing 40, in which an end face 100a of the first optical fiber 100 and an end face 200a of the second optical fiber 200 abut, due to fitting the first housing 10 to the second housing 40 and thereby the first optical fiber 100 and the second optical fiber 200 are optically connected.

First, the first optical fiber 100 and the second optical fiber 200 are described.

A sheathed portion (not illustrated) of a terminal portion is removed from the first optical fiber 100 and the first optical fiber 100 is accommodated in the first housing 10 so that an exposed front end portion 100b (hereinafter, referred to as a first front end portion 100b) of the first optical fiber 100 protrudes from a fiber inserting hole 12.

A sheathed portion (not illustrated) of a terminal portion is removed from the second optical fiber 200 and the second optical fiber 200 is accommodated in the second housing 40 so that an exposed front end portion 200b (hereinafter, referred to as a second front end portion 200b) of the second optical fiber 200 protrudes from a fiber inserting hole 42.

Next, the first housing 10 will be described.

The first housing 10 is made of a synthetic resin which can elastically deform without damage to a locking mechanism (not illustrated), the cylindrical protrusion section 20 to be described below, or the like, even after repeated attachment and detachment of the second housing 40. For example, polybutylene terephthalate (PBT) can be applied to the first housing.

In the first housing 10, a first housing base section 11 constituting a main body part, the cylindrical protrusion section 20 which protrudes from the first housing base section 11 and aligns the first and second front end portions 100b and 200b, and a first fitting guide section 30 which guides the fitting to the second housing 40 are formed through integral molding.

The first housing base section 11 has the fiber inserting hole 12 in which the first optical fiber 100 is inserted, and a fixing mechanism (not illustrated) which fixes the first optical fiber 100 to the first housing 10 through swaging, bonding, adhesion, or the like.

The cylindrical protrusion section 20 has a cylindrical hole 21 in which the first front end portion 100b is accommodated and the second front end portion 200b is insertable, and which can be elastically deformed to have a decreased diameter. The cylindrical protrusion section 20 protrudes to have a cylindrical shape in a direction toward the front end of the first housing 10 and the cylindrical hole 21 is bored on the protrusion section.

As illustrated in FIG. 2A, in the cylindrical protrusion section 20, three slits 22 are formed from the end face at positions of point symmetry around the cylindrical hole 21. In this manner, the cylindrical protrusion section 20 has three elastic piece portions 23 provided at positions of point symmetry around the cylindrical hole 21. When an external force is applied toward the inner side of the slit 22 in a radial direction, gaps between the slits 22 become narrow and the cylindrical hole 21 is deformed to have a decreased diameter. Meanwhile, when the external force is removed, the gaps between the slits 22 return to their original state.

Further, in the example, the cylindrical protrusion section 20 is illustrated to have the slits 22 formed at three positions; however, the structure of the cylindrical protrusion section is not limited thereto and other structures can be employed as long as the cylindrical hole 21 can be deformed to have a decreased diameter so that the cylindrical protrusion section 20 uniformly presses the outer circumferential surfaces of the first optical fiber 100 and the second optical fiber 200 held in the cylindrical hole 21. In addition, as illustrated in FIG. 2B, the cylindrical protrusion section 20 may have a structure in which four slits 22 are formed from the end face at positions of point symmetry around the cylindrical hole 21.

In addition, the cylindrical protrusion section 20 includes a front end tapered portion 20a having a front end portion which has a tapered shape, and a non-tapered portion 20b which is connected on the inner side of the cylindrical hole 21 from the front end tapered portion 20a and has a constant outer diameter. In a case where the first housing 10 fits to the second housing 40, an outer circumferential surface 20c of the non-tapered portion 20b becomes a contact surface with the cylinder inner circumferential surface 52 of the pressing section 50 to be described below and is parallel to the optical axis direction.

In the cylindrical protrusion section 20, in a state that no external force is applied toward the inner side in the radial direction, the hole diameter of the cylindrical hole 21 is adjusted to be slightly greater than the outer diameter of the first optical fiber 100 and the second optical fiber 200 in dimension.

In addition, since the first front end portion 100b is accommodated in the cylindrical hole 21, the cylindrical protrusion section 20 is set to protect the first front end portion 100b.

The first fitting guide section 30 corresponds to a guide that has a surface which comes into sliding contact with the outer circumferential surface of the pressing section 50 and which is formed on the inner circumferential surface, and that positions the first housing 10 and the second housing 40 in a direction orthogonal to the optical axis direction.

Next, a procedure of attaching the first optical fiber 100 in the first housing 10 will be described.

First, a sheathed portion (not illustrated) which covers a terminal portion of the first optical fiber 100 is removed, and the first optical fiber 100 is cut so that an end surface of the first optical fiber 100 becomes flat.

Then, the first optical fiber 100 is inserted in the fiber inserting hole 12 and the first front end portion 100b is disposed at a predetermined position in the cylindrical hole 21 of the cylindrical protrusion section 20.

Here, it is preferable that a distance B (refer to FIG. 3) by which the second front end portion 200b is inserted in the cylindrical hole 21 from the front end side of the cylindrical protrusion section 20 is set to be four times or more the outer diameter of the first optical fiber 100 and the second optical fiber 200. For example, in a case where the outer diameter of the first optical fiber 100 and the second optical fiber 200 is 0.5 mm, the distance B is adjusted to be 2 mm or more.

The adjustment of an attaching position of the first optical fiber 100, means a method in which, for example, a length of a convex portion of a convex jig (not illustrated) becomes 2 mm or more, and the first optical fiber 100 abuts on the front end of the convex portion in a state that the convex portion is inserted from the front end side of the cylindrical protrusion section 20.

Finally, a fixing mechanism of the first housing base section 11 fixes the first optical fiber 100 in the first housing 10 and the attachment of the first optical fiber 100 to the first housing 10 is completed.

Next, the second housing 40 will be described.

The second housing 40 is made of a synthetic resin which can elastically deform, without being damaged, to a locking mechanism (not illustrated) or the like, even after repeated attachment and detachment of the first housing 10. For example, polybutylene terephthalate (PBT) can be applied to the second housing. In the second housing 40, a second housing base section 41 constituting a main body part, the pressing section 50 having a cylindrical shape, which protrudes from the second housing base section 41 and presses the outer circumferential surface 20c of the cylindrical protrusion section 20 so that the cylindrical hole 21 is deformed to have a decreased diameter, and a second fitting guide section 60 which guides fitting, are all formed through integral molding.

The second housing base section 41 has the fiber inserting hole 42 in which the second optical fiber 200 is inserted, a fixing mechanism (not illustrated) which fixes the second optical fiber 200 to the second housing 40 through swaging, bonding, adhesion, or the like, and an excess fiber receiving space 43 which is a space in which an excess length of the second optical fiber 200 is bent and received.

The excess fiber receiving space 43 is a space which is joined to a part of the fiber inserting hole 42 and which receives a portion of the excess length generated in the second optical fiber 200 due to abutting of the first optical fiber 100 and the second optical fiber 200.

The pressing section 50 is disposed to have a bottomed cylindrical shape having a shape and dimension corresponding to the cylindrical protrusion section 20 to press the outer circumferential surface 20c of the cylindrical protrusion section 20, and to cause the front end of the second optical fiber 200 to protrude inside the cylinder from the fiber inserting hole 42.

The pressing section 50 has a tapered inner edge surface section 51 having a tapered shape, and a cylinder inner circumferential surface 52 which is connected to the tapered inner edge surface section 51 having a constant diameter.

The cylinder inner circumferential surface 52 is a surface that presses the outer circumferential surface 20c of the cylindrical protrusion section 20 so that the cylindrical hole 21 is deformed to have a decreased diameter. The inner diameter of the cylinder inner circumferential surface 52 is adjusted to be smaller than the outer diameter of the non-tapered portion 20b of the cylindrical protrusion section 20.

In addition, in a case where the first housing 10 fits to the second housing 40, the cylinder inner circumferential surface 52 becomes the contact surface with the non-tapered portion 20b and is parallel to the optical axis direction.

Accordingly, until the non-tapered portion 20b comes into contact with the cylinder inner circumferential surface 52, the cylindrical hole 21 of the cylindrical protrusion section 20 is deformed to have a decreased diameter with which the first optical fiber 100 and the second optical fiber 200 are held when the first housing 10 fits to the second housing 40.

Here, the cylindrical hole 21 is deformed to have a decreased diameter which is smaller than the outer diameter of the first optical fiber 100 and the second optical fiber 200 by about 1% to 5% in the dimension so that the first optical fiber 100 and the second optical fiber 200 can be stable and can be held.

The second fitting guide section 60 has a surface which comes into sliding contact with the outer surface of the first fitting guide section 30 and guides to perform positioning in the direction orthogonal to the optical axis direction.

In addition, the end edge surface 60a abuts on the step portion 10a provided at a connection portion between the first housing base section 11 and the cylindrical protrusion section 20, the second fitting guide section 60 performs the positioning in the optical axis direction.

Next, a procedure of attaching the second optical fiber 200 in the second housing 40 will be described.

First, a sheathed portion (not illustrated) which covers a terminal portion of the second optical fiber 200 is removed, and the second optical fiber 200 is cut so that the end surface of the second optical fiber 200 becomes flat.

Then, the second optical fiber 200 is inserted in the fiber inserting hole 42 and the second front end portion 200b is disposed to protrude inside the cylinder of the pressing section 50 from the fiber inserting hole 42.

Here, as illustrated in FIG. 3, a length L1 of the second optical fiber 200 protruding inside the cylinder of the pressing section 50 is greater than a distance L2 from the end face 100a of the first optical fiber 100 to the bottom 50a of the pressing section 50. In addition, the length L1 is set so that a difference between the length L1 and the distance L2 is less than the maximum length L3 with which the second optical fiber 200 can be bent in the excess fiber receiving space 43 ($0<L1-L2<L3$). During attachment of the second optical fiber 200, the length L1 is adjusted through abutting of the end face of the second optical fiber 200 using a jig (not illustrated) or the like.

Finally, the fixing mechanism of the second housing base section 41 fixes the second optical fiber 200 to the second housing 40 and the attachment of the second optical fiber 200 to second housing 40 is completed.

In the optical connector 1, the fitting position is shifted in the optical axis direction by the distance C (refer to FIG. 4) due to the backlash of the locking mechanism. In this case, a contact zone between the non-tapered portion 20b and the cylinder inner circumferential surface 52 is adjusted to be longer than the distance C, and thereby the cylindrical hole 21 can maintain the hole diameter, in which the fibers are held in the state in which the first optical fiber 100 and the second optical fiber 200 abut. As a result, it is possible to reliably hold the first optical fiber and the second optical fiber even when there is backlash in the optical connector.

In this case, in a case where the second optical fiber 200 is drawn toward the front side of the second housing 40 due to the shift of the fitting position by the distance C, the second optical fiber 200 is not damaged because an amount of change (that is, an amount of length of the distance C) of the second optical fiber 200 is received by the bending of the excess length of the second optical fiber 200.

Next, an operation until the fitting of the first housing 10 in the second housing 40 is completed will be described using FIG. 5.

Figures 5A, 5B:
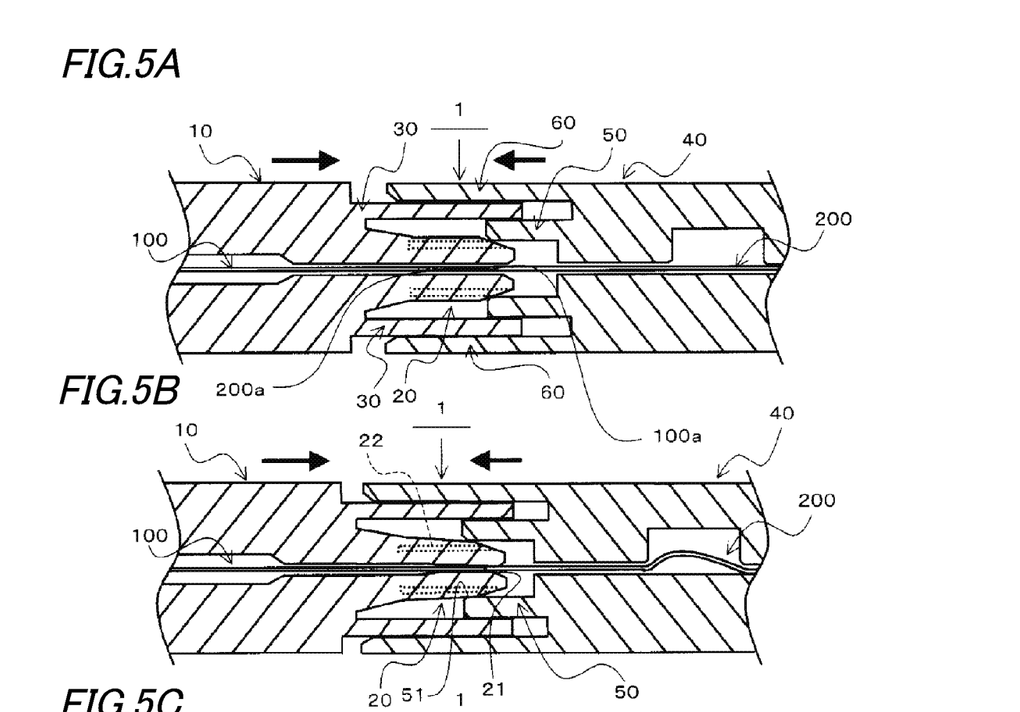
FIG. 5A to FIG. 5C are views illustrating operations until fitting the first housing to the second housing is completed.
Figure 5C:
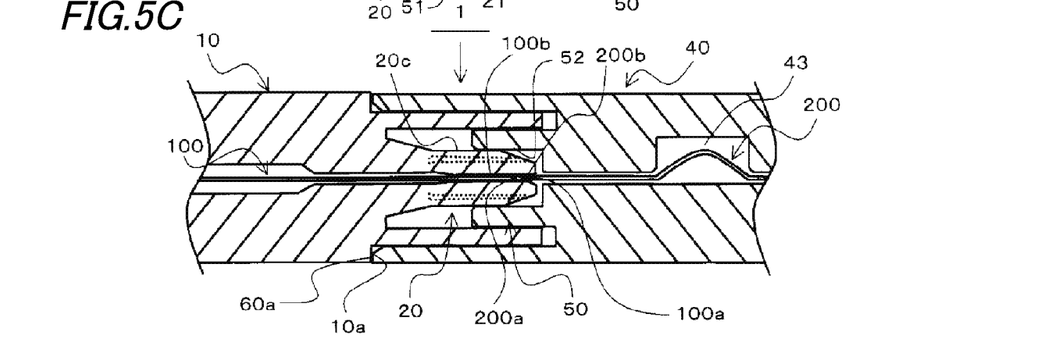

When fitting the first housing 10 to the second housing 40 is started, the first housing 10 and the second housing 40 move in the fitting direction while being guided by the first fitting guide section 30 and the second fitting guide section 60, and the end faces 100a and 200a of the first optical fiber 100 and the second optical fiber 200 abut (refer to FIG. 5A).

Then, when the first housing 10 and the second housing 40 further move in the fitting direction, the front end tapered portion 20a comes into sliding contact with a tapered inner edge surface section 51 and the diameter of the cylindrical hole 21 is gradually reduced (refer to FIG. 5B). The excess length of the second optical fiber 200 is bent and received in the excess fiber receiving space 43 due to the movement thereof in the fitting direction.

Finally, until the end edge surface 60a of the second fitting guide section 60 abuts on the step portion 10a, the first housing 10 and the second housing 40 move in the fitting direction and is locked by the locking mechanism. In this manner, the fitting the first housing 10 to the second housing 40 is completed in the optical connector 1 (refer to FIG. 5C).

Here, the outer circumferential surface 20c and the cylinder inner circumferential surface 52 come into contact with each other and the first and second front end portions 100b and 200b are held in a state that the end faces 100a and 200a of the first and second front end portions abut.

In the optical connector 1 according to the example of the present invention, in a case where the first housing 10 fits to the second housing 40, the cylindrical hole 21 is deformed to have a decreased diameter by the pressing section 50, and the first and second front end portions 100b and 200b are held in the cylindrical hole 21 in a state that the end faces 100a and 200a abut. Accordingly, since the axes of the abutting first and second optical fibers 100 and 200 are not shifted, it is possible to suppress optical connection loss.

In addition, in the optical connector 1 according to the example of the present invention, the second optical fiber 200 is bent in the excess fiber receiving space 43, and thereby it is possible to receive the excess length of the second optical fiber 200.

In addition, in the optical connector 1 of the example of the present invention, the three slits 22 at three positions, which are formed on the front end portion of the cylindrical protrusion section 20 enables the cylindrical hole 21 to be easily elastically deformed to have a decreased diameter, and the cylindrical protrusion section 20 can hold the first optical fiber 100 and the second optical fiber 200 while a uniform pressing force is applied to the outer circumferential surfaces of the first optical fiber 100 and the second optical fiber 200.

In addition, in the optical connector 1 according to the example of the present invention, the contact surfaces 20c and 52 of the outer circumferential surface 20c of the cylindrical protrusion section 20 with the cylinder inner circumferential surface 52 of the pressing section 50 are parallel to the optical axis direction, and the zone of the contact surfaces 20c and 52 are adjusted to be longer than the length of the shift of the fitting position due to the backlash. Accordingly, even in a case where the fitting position is shifted in the optical axis direction due to the backlash in the optical axis direction, the cylindrical hole 21 can maintain the hole diameter, in which the first optical fiber 100 and the second optical fiber 200 are held in the state in which the first optical fiber and the second optical fiber abut. As a result, it is possible to reliably hold the first optical fiber 100 and the second optical fiber 200 even when there is backlash in the optical connector 1.

Further, the optical connector 1 according to the present invention is described as an example, in which the plurality of slits 22 are formed in the cylindrical protrusion section 20, and thereby the cylindrical hole 21 is deformed to have a decreased diameter, which is illustrated. However, the structure is not limited thereto, and other structures may be employed as long as the cylindrical hole 21 of the cylindrical protrusion section 20 can be deformed to have a decreased diameter. For example, a structure, in which no slit 22 is formed in the cylindrical protrusion section 20 and the cylindrical protrusion section 20 is pressed by the pressing section 50, and thereby the cylindrical hole 21 is deformed to have a decreased diameter, may be employed.

In addition, in the optical connector 1 according to the example of the present invention, a structure, in which the excess fiber receiving space 43 is provided in the second housing 40, is illustrated. However, the structure is not limited thereto, and even a structure, in which the excess fiber receiving space, which is a space in which the excess length amount of the first optical fiber 100 is bent and received, may be provided even in the first housing 10.

In addition, in the optical connector 1 according to the example of the present invention, the cylindrical protrusion section 20 is illustrated to have a circular cylindrical shape; however, it is not limited thereto and any shape may be employed as long as the shape is cylindrical or, for example, a rectangular tube shape may be employed.

As above, the invention by the inventors is specifically described based on the example of the invention described above; however, the present invention is not limited to the example of the invention; however, various modifications can be performed within a range without departing from the gist thereof.

Here, characteristics of the embodiments of the optical connector according to the present invention described above are briefly summarized and listed as the following [1] to [4].

[1] An optical connector (1) comprising a first housing (10), a first optical fiber (100) accommodated in the first housing, a second housing (40) to which the first housing fits, and a second optical fiber (200) accommodated in the second housing, wherein an end face (100a) of the first optical fiber abuts on an end face (200a) of the second optical fiber due to fitting the first housing to the second housing and thereby the first optical fiber and the second optical fiber are optically connected, the first housing comprising a cylindrical hole (21) in which the front end portion (100b) of the first optical fiber is accommodated and a front end portion (200b) of the second optical fiber is insertable and which is elastically deformable to have a decreased diameter, and a cylindrical protrusion section (20) which protrudes to have a cylindrical shape in a direction toward a front end of the first housing, the second housing comprising a pressing section (50) which presses the outer circumferential surface of the cylindrical protrusion section so that the cylindrical hole is deformed to have a decreased diameter, wherein the cylindrical hole is deformed to have a decreased diameter by the pressing section, and thereby the front end portions of the first optical fiber and the second optical fiber are held in the cylindrical hole in a state that the end face of the front end portion of the first optical fiber abuts on the end face of the front end portion of the second optical fiber, in a case where the first housing is fitted to the second housing.

[2] The optical connector according to the above [1], at least one of the first housing and the second housing further comprising a space (excess fiber receiving space 43) in which an excess amount of the first optical fiber and the second optical fiber is configured to be bent and received.

[3] The optical connector according to the above [1] or [2], wherein a plurality of slits (22) formed from the end face at positions of point symmetry around the cylindrical hole in the cylindrical protrusion section.

[4] The optical connector according to the above [1], [2], or [3], wherein a contact surface of the cylindrical protrusion section with the pressing section is parallel to an optical axis direction in a case where the first housing is fitted to the second housing.

The present invention is described in detail and with reference to specific embodiments; however, it is obvious for those skilled in the art that it is possible to perform various changes or modifications without departing from the spirit and the range of the present invention.

This application is based on Japanese Patent Application No. 2013-140321, filed Jul. 4, 2013, the content of which is incorporated herein by reference.

INDUSTRIAL APPLICABILITY

According to the present invention, since axes of two abutting optical fibers are not shifted, it is possible to suppress optical connection loss. The present invention exhibiting the achieved effect is effective for the optical connector in which end faces of the optical fibers are optically connected without using a ferrule.

Reference Signs List

| | |
|---|---|
| 1 | optical connector |
| 10 | first housing |
| 10a | step portion |
| 11 | first housing base section |
| 12 | fiber inserting hole |
| 20 | cylindrical protrusion section |
| 20a | front end tapered portion |
| 20b | non-tapered portion |
| 20c | outer circumferential surface (contact surface) |
| 21 | cylindrical hole |
| 22 | slit |
| 23 | elastic piece portion |
| 30 | first fitting guide section |
| 40 | second housing |
| 41 | second housing base section |
| 42 | fiber inserting hole |
| 43 | excess fiber receiving space |
| 50 | pressing section |
| 50a | bottom |
| 51 | tapered inner edge surface section |
| 52 | cylinder inner circumferential surface (contact surface) |
| 60 | second fitting guide section |
| 60a | end edge surface |
| 100 | first optical fiber |
| 100a | end face |
| 100b | front end portion |
| 200 | second optical fiber |
| 200a | end face |
| 200b | front end portion |

What is claimed is:

1. An optical connector comprising:
a first housing;
a first optical fiber accommodated in the first housing;
a second housing which fits to the first housing; and
a second optical fiber accommodated in the second housing,
wherein an end face of the first optical fiber abuts on an end face of the second optical fiber due to fitting the first housing to the second housing so that the first optical fiber and the second optical fiber are optically connected,
wherein the first housing comprises:
a cylindrical hole in which a front end portion of the first optical fiber is accommodated and a front end portion of the second optical fiber is insertable and which is elastically deformable to have a decreased diameter; and,
a cylindrical protrusion section which protrudes to have a cylindrical shape in a direction toward a front end of the first housing, the cylindrical protrusion section including an outer circumferential surface having a front-end tapered portion and a non-tapered portion, which is connected on an inner side of a cylindrical hole from the front-end tapered portion,
wherein the second housing comprises:
a pressing section which presses the outer circumferential surface of the cylindrical protrusion section so that the cylindrical hole is deformed to have a decreased diameter, the pressing section configured to press the front-end tapered portion until the pressing section makes contact with the non-tapered portion as the first housing is fitted to the second housing and configured to press the non-tapered portion, but not the front-end tapered portion, upon making contact with the non-tapered portion as the first housing is fitted to the second housing, and
wherein the cylindrical hole is deformed to have a decreased diameter by the pressing section, and thereby the front end portions of the first optical fiber and the second optical fiber are held in the cylindrical hole in a state that the end face of the front end portion of the first optical fiber abuts on the end face of the front end portion of the second optical fiber, in a case where the first housing is fitted to the second housing.

2. The optical connector according to claim 1, wherein at least one of the first housing and the second housing further comprises:

a space in which an excess amount of the first optical fiber and the second optical fiber is configured to be bent and received, wherein the space is apart from the cylindrical protrusion section in an optical axis direction.

3. The optical connector according to claim 1, wherein a plurality of slits are formed from the end face at positions of point symmetry around the cylindrical hole in the cylindrical protrusion section.

4. The optical connector according to claim 2, wherein a plurality of slits are formed from the end face at positions of point symmetry around the cylindrical hole in the cylindrical protrusion section.

5. The optical connector according to claim 1, wherein the non-tapered portion as a contact surface of the cylindrical protrusion section makes contact with the pressing section and is parallel to an optical axis direction, in a case where the first housing is fitted to the second housing.

6. The optical connector according to claim 2, wherein the non-tapered portion as a contact surface of the cylindrical protrusion section makes contact with the pressing section and is parallel to an optical axis direction, in a case where the first housing is fitted to the second housing.

7. The optical connector according to claim 3, wherein the non-tapered portion as a contact surface of the cylindrical protrusion section makes contact with the pressing section and is parallel to an optical axis direction, in a case where the first housing is fitted to the second housing.

8. The optical connector according to claim 4, wherein the non-tapered portion as a contact surface of the cylindrical protrusion section makes contact with the pressing section and is parallel to an optical axis direction, in a case where the first housing is fitted to the second housing.

* * * * *